E. T. WATERS.
INK DISTRIBUTING MECHANISM.
APPLICATION FILED SEPT. 11, 1920.

1,427,988.

Patented Sept. 5, 1922.
6 SHEETS—SHEET 1.

E. T. WATERS, Inventor.

Witness:
R. J. Honomichl.

By David O. Barnell.
Attorney

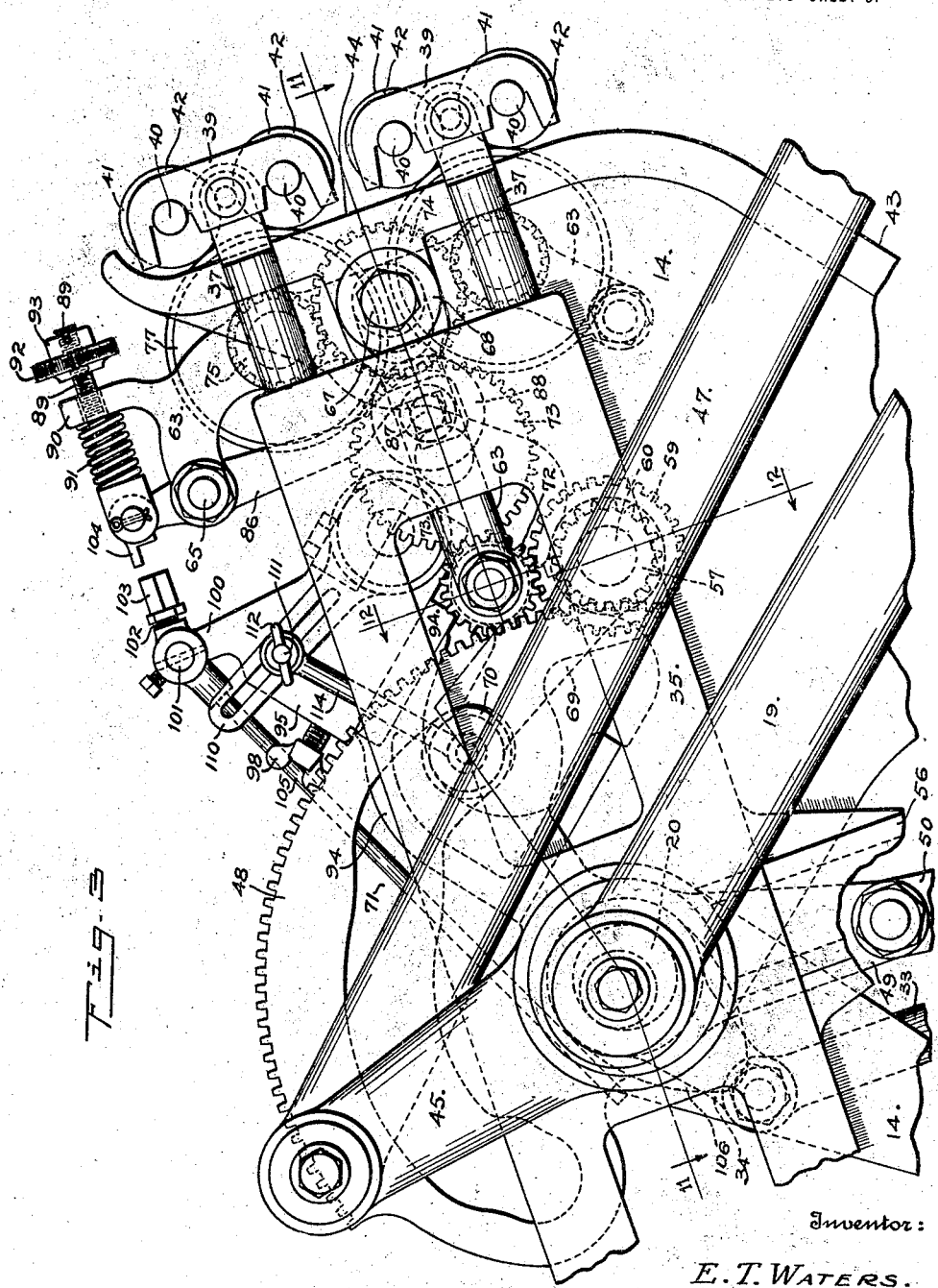

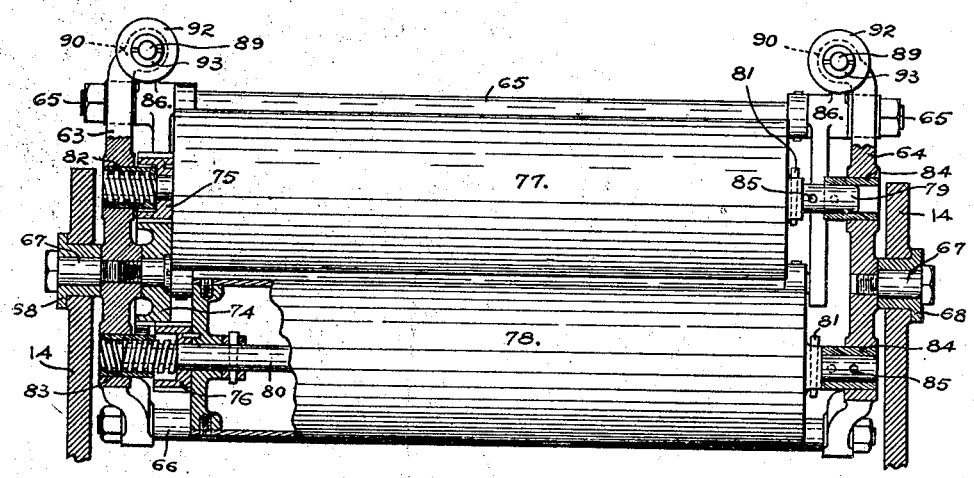
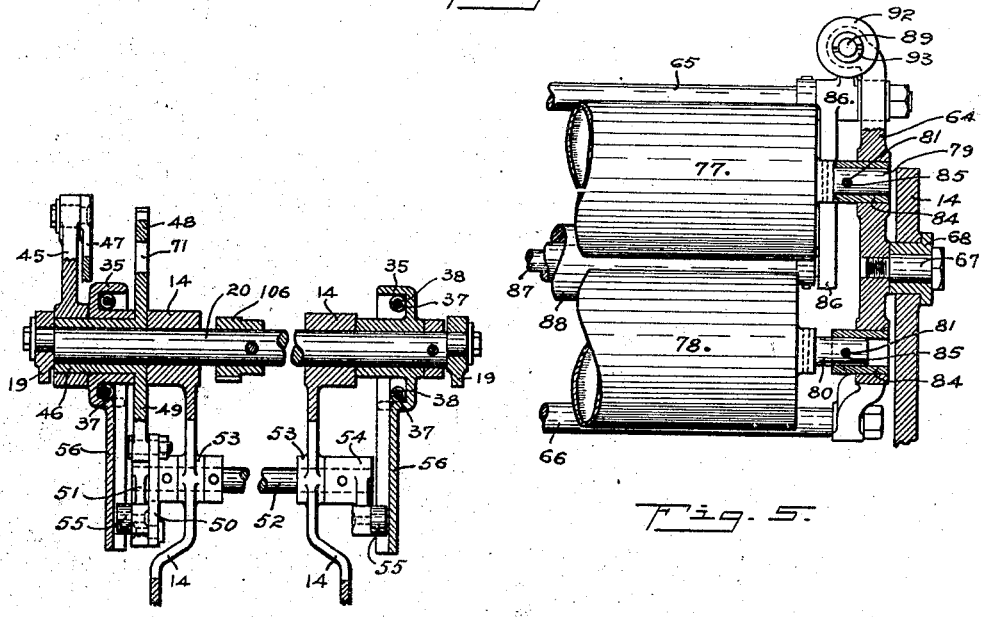

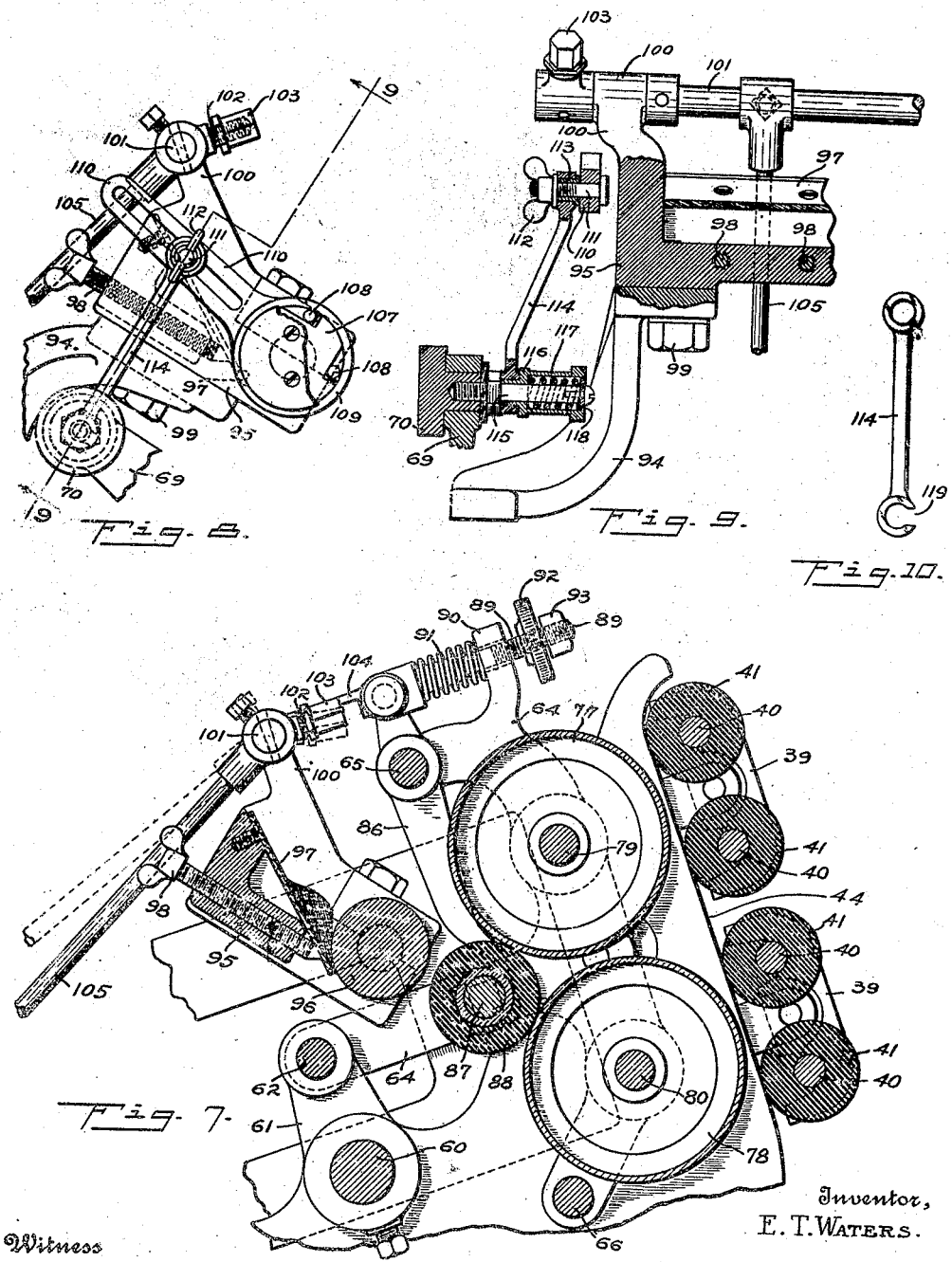

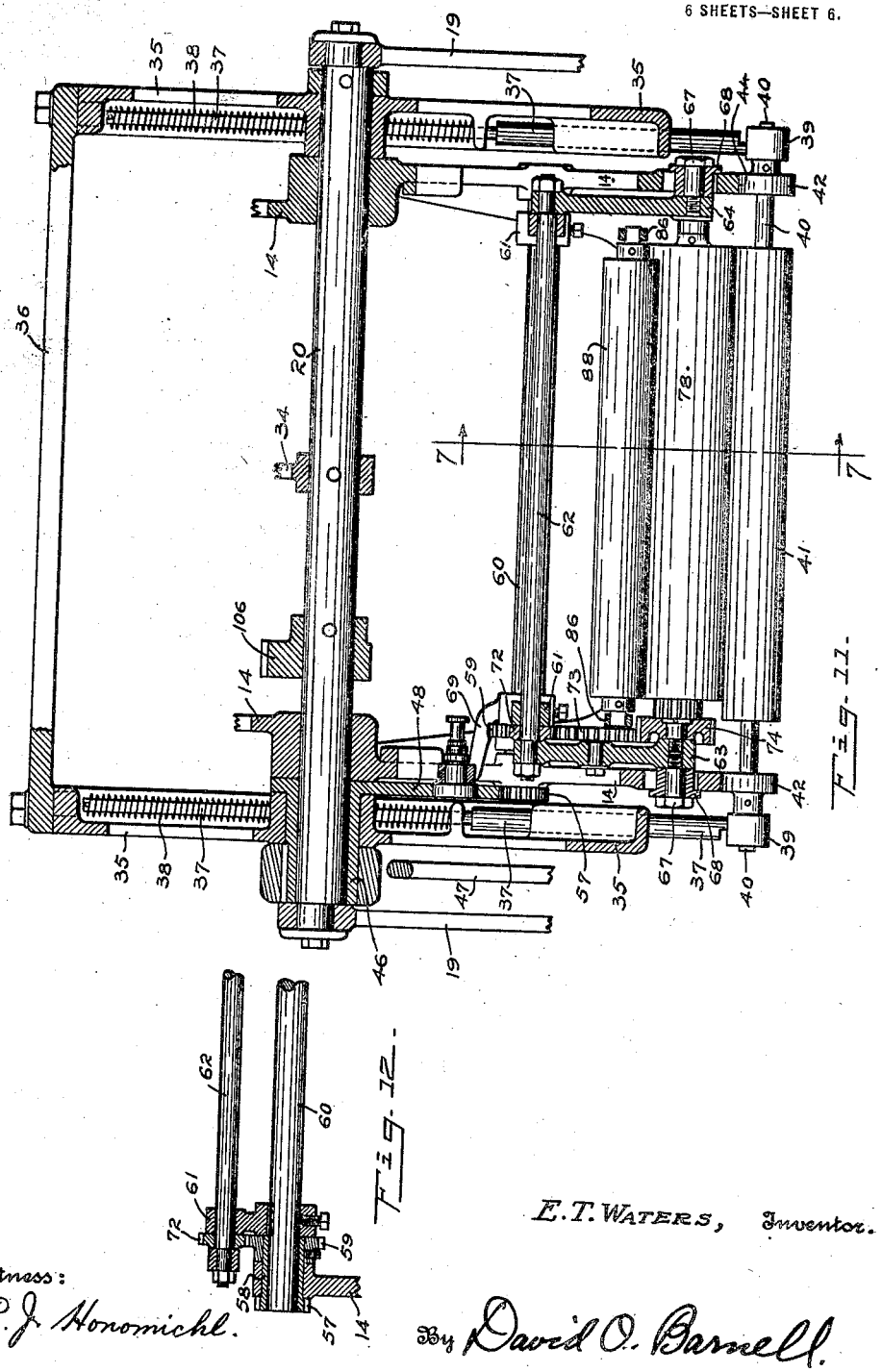

Patented Sept. 5, 1922.

1,427,988

UNITED STATES PATENT OFFICE.

EDWARD T. WATERS, OF OMAHA, NEBRASKA.

INK-DISTRIBUTING MECHANISM.

Application filed September 11, 1920. Serial No. 409,680.

*To all whom it may concern:*

Be it known that I, EDWARD T. WATERS, a citizen of the United States, and a resident of Omaha, in the county of Douglas and State of Nebraska, have invented certain new and useful Improvements in Ink-Distributing Mechanism, of which the following is a specification.

My invention relates to ink distributing mechanism for use on printing presses of the class employing an oscillating bed and platen. It is the general object of my invention to provide for presses of this class an inking mechanism wherein the "spread" or distribution of the ink is much more extensive than is attainable with the rotary flat disk distributors commonly used. More specific objects of my invention are to provide, for oscillating bed presses, an inking mechanism employing rollers throughout for effecting the transfer of the ink from a fountain to the printing-form; to provide distributing rollers which are constantly revolved in alternating directions and to which ink is transferred intermittently from the ink fountain; to provide form-rollers which are moved over the printing-form in the usual way but which dwell in rolling contact with the distributing rollers during the portions of the operating cycle in which the impressions are made between the form and platen; to provide improved actuating means for the fountain-roller, whereby the feed movement thereof may be widely varied by gradations of any degree; to provide means whereby the distributing rollers may be moved longitudinally to effect lateral distribution of the ink, or, at the will of the operator, the longitudinal movement of said rollers discontinued; to provide means for moving the distributing rollers from and toward the form-roller track, whereby to lift the form-roller trucks from the track during the dwell thereof and to re-engage said trucks with the track at the conclusion of the dwell; to provide suitable driving means for the aforesaid inking mechanism, and to actuate the same solely by the reciprocating or oscillating movement of the bed relative to the frame of the press; and to provide certain other desirable structures and combinations of operating elements, which will be explained in detail hereinafter.

Figure 1:
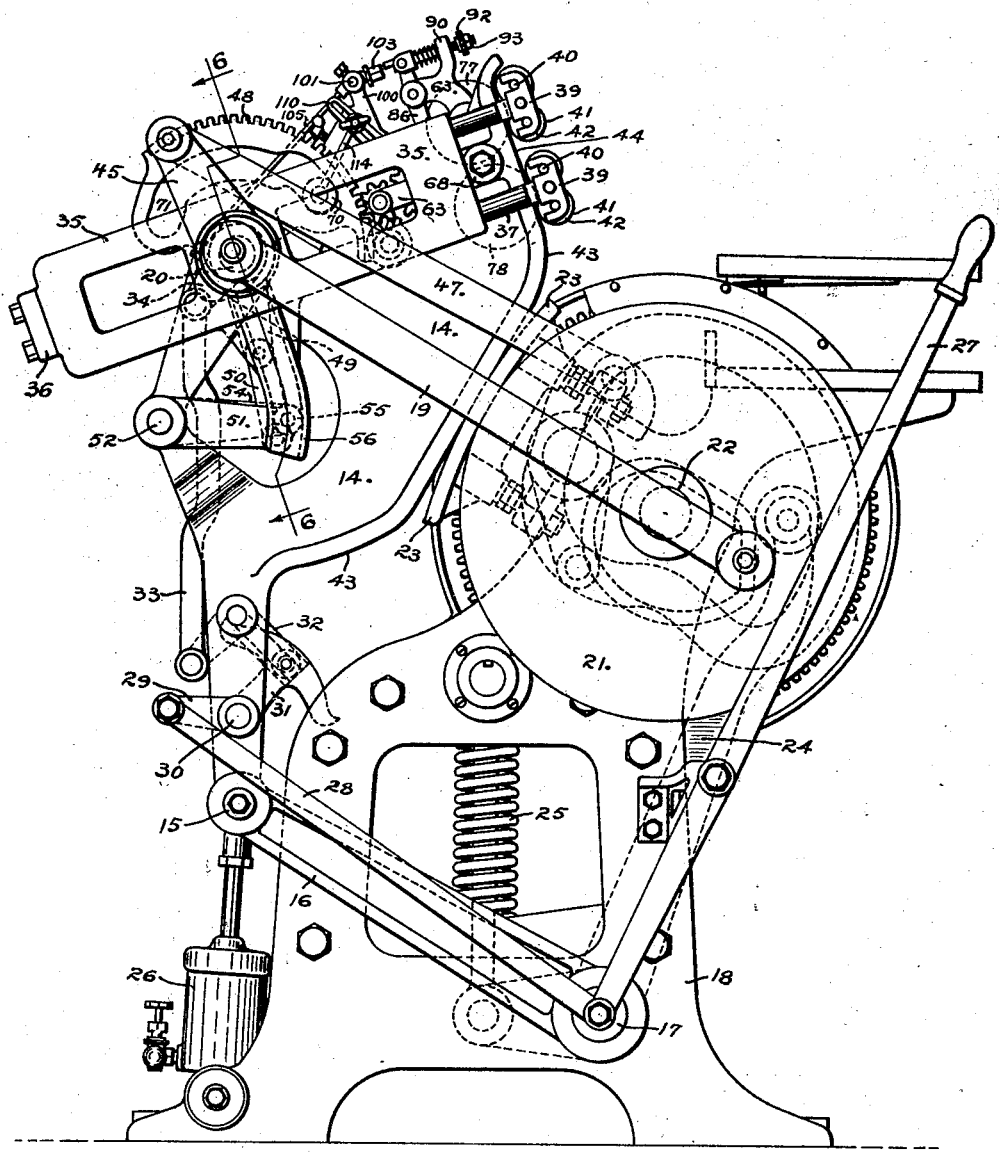
Figure 2:
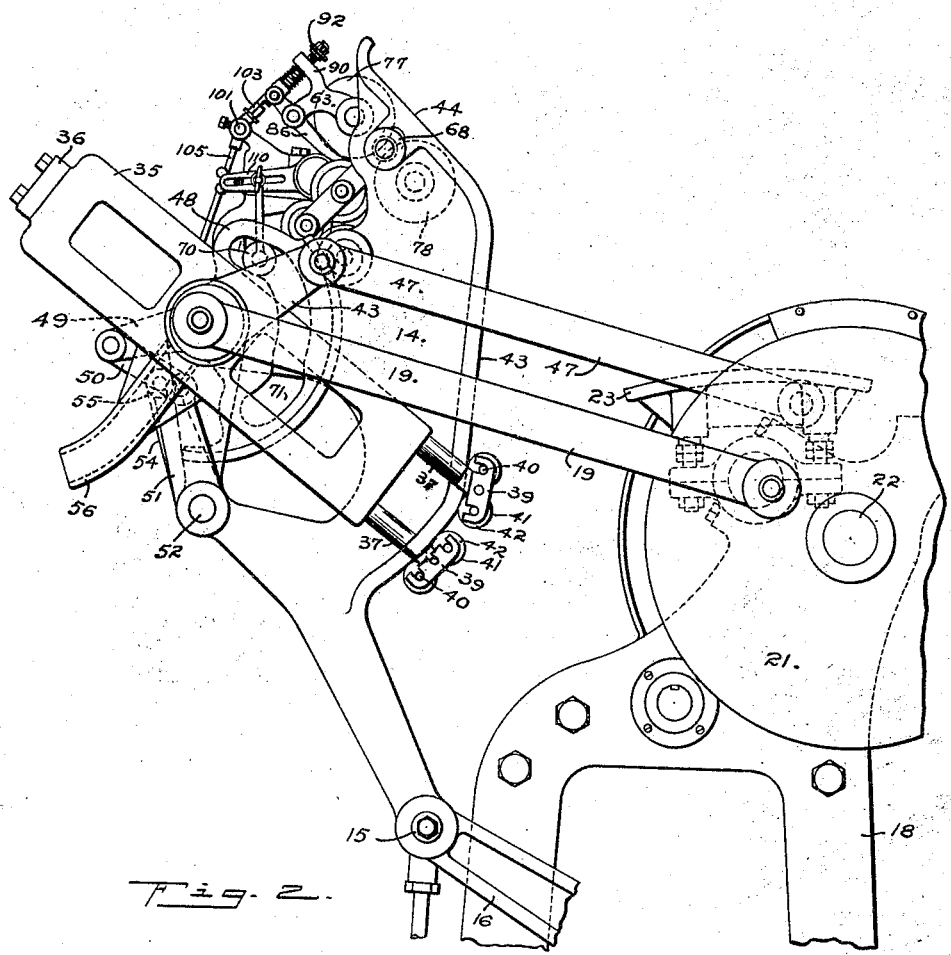

In the accompanying drawings Fig. 1 is a side elevation of a press provided with inking mechanism embodying my invention, the parts being in the impression position, Fig. 2 is a partial side elevation showing the parts in the positions assumed at the middle of the form-inking phase of the cycle, Fig. 3 is a detail side view of the distributing mechanism, drawn to a larger scale than the preceding views, and showing the form-rollers in the dwell position, astride and in rolling contact with the distributing-rollers, Fig. 4 is a detail front view and partial axial section of the distributing-rollers, Fig. 5 is a partial front view and axial section of the distributing-rollers, showing the same as arranged for non-oscillation longitudinally, Fig. 6 is a detail transverse section on the irregular or broken plane of the line 6—6 of Fig. 1, Fig. 7 is a detail vertical section of the fountain, carrier-roller, distributing-rollers and form-rollers, on the plane of the line 7—7 of Fig. 11, Fig. 8 is a detail side view of the ink-fountain, showing the roller-clutch and adjustable driving means therefor, Fig. 9 is a detail transverse section of the fountain on the line 9—9 of Fig. 8, Fig. 10 is a detail side view of the connecting-rod for the fountain-roller actuating means, Fig. 11 is a transverse section of the distributing mechanism on the irregular plane of the line 11—11 of Fig. 3, and Fig. 12 is a detail transverse section on the line 12—12 of Fig. 3.

In the illustrated construction my inking mechanism is shown as applied to a press having a curved or cylindro-segmental platen, such as that described and claimed in my application for patent thereon filed Feb. 24, 1919, Serial No. 279,004. While the inking mechanism is especially designed and adapted for use with said curved-platen press, to which it gives an ink-distribution of an efficiency in conformity with the quality of impression obtainable therewith, it will be obvious that the same general form of distributing devices may be employed for any oscillating-bed press of the common and well-known "Gordon" class.

Referring briefly to the general structure of the press shown, the bed 14 carries at the front side thereof the usual chase for holding the printing-form, and said bed is pivoted on a bottom-shaft 15 carried at the rear ends of arms 16, the latter being secured to the ends of a rocking-shaft 17 which is mounted pivotally in the stationary frame 18. The bed 14 is oscillated about the bottom-shaft 15 by means of crank-driven side-arms 19 connected with eccentric end-portions of the back-shaft 20 which passes transversely through rearwardly extending side-portions of the bed. The crank-disks 21, which actuate the side-arms 19, are carried at the ends of the main-shaft 22, said disks having at the inner sides thereof groove-cams which actuate rocker-arms for controlling the oscillating movements of the platen 23. The main-shaft 22 also carries a cam which controls movement of an arm 24 secured on the rocking-shaft 17, whereby to impart to the arms 16 the required oscillating movements for raising and lowering the bed and thus causing the necessary traverse of the bed during the rolling impression of the curved platen with the flat printing-form. The weight of the bed is partially counter-balanced by means of a spring 25, connected with a short rearwardly extending arm on the rocking-shaft 17, and the downward movement of the bed is further controlled by a dash-pot or buffer-cylinder 26 pivotally connected with the lower rearward portion of the frame, and having a piston connected with the bottom-shaft 15. A throw-off lever 27 is pivoted at the side of the frame 18, and by means of the cooperating train of members 28, 29, 30, 31, 32, 33 and 34, said lever is connected with the back-shaft 20 so that by moving the lever the back-shaft may be rotated and the eccentric end-portions of said shaft so moved as to carry the bed slightly rearward in relation to the side-arms, whereby to prevent impression or contact between the platen and the printing-form.

At each side of the bed, mounted pivotally upon the laterally projecting end-portions of the back-shaft, are the roller-frames 35, which are connected with each other at their rear ends by a transverse bar 36. Each roller-frame carries a pair of saddle-rods 37, which protrude from the front ends of the frames, and are longitudinally slidable therein, each rod having a coil spring 38 arranged on the rear portion thereof so as to tend to retract the same into the frame. At the front ends of the rods 37 double saddles 39 are pivoted thereon, said saddles being adapted to engage releasably the end-portions of the form-roller shafts 40. I preferably employ two pairs of form-rollers 41, as shown, said rollers being of the usual soft ink-roller composition, molded upon the central portions of the shafts 40. Each of the form-roller shafts 40 carries, on the end-portions thereof adjoining the saddles 39, trucks 42 which are of substantially the same diameter as the composition rollers, and said trucks are normally held by the saddle-rod retracting-springs 38 in rolling engagement with tracks 43 formed at the sides, and constituting the front edges, of the bed. The intermediate portions of the tracks 43 are straight, and parallel to and transversely alined with the type-face of the printing-form; the lower portions of the tracks curve rearwardly toward the leg-portions of the bed; and the upper portions of the tracks curve back and join the diagonal upwardly and rearwardly extending straight portions 44. All portions of the tracks are preferably, as nearly as possible consistent with the formation of the upper and intermediate straight portions, equi-distant from the back-shaft axis about which the roller-frames move, whereby longitudinal movements of the saddle-rods in the frames are kept to a minimum. The length of the upper straight track portions 44 is preferably but little more than necessary to receive the two pairs of form-rollers after the same pass around the curve between said upper and the intermediate straight portion of the tracks.

It will be seen that the general arrangement of the bed, printing form, roller-frames and form-rollers is quite similar to that usually employed in presses of the "Gordon" type, but the roller-frames herein are actuated differently, as will now appear. In the present structure there is provided a crank-arm 45 which is pivotally connected with the back-shaft 20, being secured upon a sleeve 46 which fits revolubly upon said shaft and within the hub-portion of the adjacent roller-frame, and said crank-arm 45 being positioned transversely intermediate the adjacent side-arm 19 and roller-frame, as shown clearly in Fig. 6. To the upper end of said crank-arm 45 there is pivotally connected the rear end of an arm or connecting-bar 47, the front end of said bar being connected pivotally with a portion of the fixed frame 18, so that during the oscillation of the bed said arm 45 is moved about the axis of the back-shaft in the same way as it would if the bed were stationary and the connecting-bar moved reciprocatingly. For convenience of description hereinafter, the movements of the parts which are mounted upon the bed will be considered with relation to the bed as a fixed body, so that said arm 45 will be regarded as oscillating about the back-shaft as a fixed center, although it should be clearly understood that the actual movement of the upper end of the arm is merely on an arc about the axis of the pivoted front end of the connecting-bar 47.

At the inner end of the sleeve 46 a segment-plate 48 is secured to or formed integrally therewith, said plate extending between the side of the bed and the adjacent roller-frame, as shown in Figs. 6 and 11. The lower portion of said plate 48 is extended down to form an arm 49 to which is pivotally connected a bar 50, and the opposite end of said bar 50 is pivotally connected with an arm 51 carried at one end of a transverse rocking-shaft 52, said shaft being mounted in suitable bearings 53 formed by rearward extensions of the sides of the bed 14. At the end of the rocking-shaft 52 opposite the arm 51 there is secured arm 54, and upon the outer sides of said arms 51 and 54 are revolubly mounted axially alined cam-rollers 55. Said rollers 55 fit in cam-grooves formed in the inner sides of downwardly extending arms 56 on the roller-frames. The upper portions of the cam-grooves are rectilinear and extend radially of the back-shaft, but the lower portions of said cam-grooves are curved so as to extend concentrically with the rocking-shaft 52 when the roller-frames are in the positions shown in Figs. 1 and 3. The parts are so arranged that when the crank-arm 45 is in the rearward position shown in the figures last named, the arms 51 and 54 extend forwardly from the rocking-shaft, and the cam-rollers 55 are in the curved portions of the cam-grooves. During the oscillating movements of the crank-arm 45 about the back-shaft the rocking-shaft is actuated in the opposite directions by the driving connection afforded by the arms 49 and 51 and the connecting-bar 50, so that the arms 51 and 54 are oscillated between the positions shown in Figs. 1 and 2. It will be seen that during portions of the movements of said arms 51 and 54 the cam-rollers 55 will move in the curved portions of the cam-grooves in the arms 56, and, as said portions of the cam-grooves are then concentric with the rocking-shaft, the roller-frames will be held stationary during said portion of the movement. During the forward movement of the crank-arm 45, as the cam-rollers 55 enter the straight portions of the cam-grooves, the rearward movement of the arms 51 and 54 begins to be communicated to the arms 56 and thus the roller-frames are rotated about the axis of the back-shaft to carry the form-rollers down from the raised position shown in Fig. 1, across the printing-form, to the lower position shown in Fig. 2. During the reverse or rearward movement of the crank-arm 45 the form-rollers are moved back up to the original raised positions thereof, and, as the cam-rollers 55 again enter the curved portions of the cam-grooves the roller-frames and form-rollers are again held stationary.

The upper peripheral portion of the segment-plate 48 is provided with gear-teeth which mesh with a pinion 57, so that said pinion is driven in alternating directions during the oscillating movements of the crank-arm 45 about the back-shaft. Said pinion 57 is carried on the outer end of a sleeve 58 which is journaled in a bearing formed in the side-portion of the bed, and at the inner end of said sleeve 58 there is carried a gear 59. A transverse rocking-shaft 60 has one end thereof pivotally mounted within the sleeve 58, and the other end similarly mounted in a bearing formed at the opposite side of the bed. Arms 61 are secured to said rocking-shaft 60 and extend upwardly therefrom, the upper ends of said arms being connected pivotally with a cross-rod 62. The ends of said cross-rod are connected fixedly with the side-members 63 and 64 of the distributing-roller frame, which comprises said side-members, the rear cross-rod 62, an upper cross-rod 65, and a lower cross-rod 66. At the forward portions of the side-members 63 and 64 are laterally extending studs 67 on which are revolubly mounted flanged rollers 68, the latter extending through slots in the sides of the bed, and said slots extending perpendicularly to the upper straight portions 44 of the tracks for the form-roller trucks 42. One of the arms 61 on the rocking-shaft 60 has formed integrally therewith a rearwardly and laterally extending arm 69, of which the rear end is adjacent to the inner side of the segment-plate 48. On said end of the arm 69 there is revolubly mounted a roller 70 which extends into a cam-slot 71 formed in the plate 48, whereby during the movements of said plate certain oscillating movements are imparted to the arm 69 and rocking-shaft 60, as hereinafter noted. The gear 59 meshes with and drives a pinion 72 mounted revolubly on the rear cross-rod 62, and said pinion 72 meshes with and drives an intermediate gear 73 which is mounted revolubly on the inner side of the side-member 63. The gear 73 meshes with and drives a gear 74 which is similarly mounted on the side-member 63, and said gear 74 meshes with and drives the pinions 75 and 76 which are secured, respectively, at the ends of the upper and lower distributing-rollers 77 and 78. The distributing-rollers are made hollow or tubular, in order to reduce the weight thereof, and the end-plates of said rollers fit revolubly on shafts 79 and 80. Normally, the distributing-rollers are fixedly connected with the shafts 79 and 80 by means of taper pins 81 which fit removably in alined holes in the shafts and the hubs of the roller end-plates adjacent the side-member 64, as shown in Fig. 4. At the end of the shaft 79 adjoining the drive-pinion 75, a right-hand thread is formed on said shaft, and said threaded shaft-portion fits within a threaded bushing 82 secured in the side-member 63. The end-portion of the shaft 80 adjoining the pinion 76 has a left-hand thread formed thereon, which fits in a similarly threaded bushing 83 secured in the side-member 63. The opposite ends of the shafts 79 and 80 fit revolubly and slidably in bushings 84 secured in the side-member 64.

It will be seen that the alternating rotary movements of the pinion 57 will be transmitted to the distributing-rollers through the driving connection afforded by the sleeve 58, gear 59, pinion 72, gear 73, gear 74, and pinions 75 and 76. The extent of the rotary movements of the distributing-rollers in each direction is such that, when said rollers are fixedly connected with the shafts 79 and 80 by the taper pins 81, the threaded portions of said shafts will be screwed into and out of the bushings 82 and 83, and thus impart opposite longitudinal movements to the distributing-rollers, equal in amount to the difference in the longitudinal positions of said rollers shown in Fig. 4.

Should it be desired to dispense with said longitudinal movements of the distributing-rollers, the taper pins 81 which connect the shafts and rollers are removed, thus leaving the rollers free to revolve upon the shafts. Before removing the taper pins, however, the rollers are so rotated that holes 85, formed in the shafts as shown in Fig. 4, are brought into alinement with corresponding holes in the bushings 84, as shown in Fig. 5, and the same taper pins 81, as removed from the hubs of the roller end-plates, are inserted through said holes 85 to thereby fixedly connect the shafts with said bushings 84. It is desirable that the same pins be employed to make the described alternative connections, in order that there may be no liability of simultaneously pinning the rollers to the shafts and the shafts to the bushings, which would prevent rotation of the rollers and cause injury to the driving gear-train.

Referring now to the cam-slot 71 in the segment-plate 48, it will be noted that the forward end-portion of said slot is concentric with the axis of the back-shaft, about which the segment-plate is oscillated, and also that said portion of the cam-slot is farthest from the axis of rotation. The parts are so proportioned that when the roller 70 lies in said outer or forward portion of the cam-slot, the distributing-roller frame will be pushed forwardly, due to the rotation of the rocking-shaft 60 in a direction such as to move forwardly the upper ends of the arms 61, and the distributing-rollers are thus moved forwardly to positions such as shown in Fig. 3, at which the form-rollers are engaged thereby, and the form-roller trucks 42 lifted off the tracks 44, as in said figure. As the crank-arm 45 and the segment-plate move forwardly, from the position above mentioned. the distributing-rollers are held in the forward position until the cam-roller 70 passes into an inwardly offset portion of the cam-slot, when the movement imparted to the arm 69 and rocking-shaft 60 causes the distributing-rollers to be withdrawn to positions such as shown in Fig. 7, thus re-seating the form-roller trucks 32 upon the tracks 44, and enabling the form-rollers to be moved down over the form without riding over the distributing-rollers or being again lifted thereby. The distributing-rollers remain in the last described position while the cam-roller 70 traverses the intermediate portion of the cam-slot 71, said intermediate portion of the slot being concentric with the axis of rotation. At the rear end of the cam-slot 71 the same is again inwardly offset, and as the cam-roller 70 passes into this portion of the slot a further rearward movement is imparted to the distributing-roller frame, said movement being utilized, as hereinafter set forth, for causing a transfer of ink from the fountain to the distributing-rollers.

On the upper cross-rod 65 of the distributing-roller frame, adjoining the inner sides of the side-members 63 and 64, levers 86 are mounted pivotally, and the lower ends of said levers are formed into rectangular hooks adapted to receive detachably the squared ends of a transverse shaft 87. On the intermediate portion of said shaft 87 a roller 88 is mounted revolubly, the outer portion of said roller being of a soft composition, the same as employed for the form-rollers. To the upper ends of the levers 86 are pivotally connected the rods 89, which extend forwardly and pass loosely through openings in lugs 90 formed at the upper portions of the side-members 63 and 64. Coil springs 91 are disposed around said rods 89 between the lugs 90 and enlarged heads at the rear ends of the rods, and said springs, by pressing rearwardly the upper ends of the levers 86, tend to swing the lower ends of the levers forwardly, and thus normally hold the composition roller 88 yieldingly in contact with the distributing-rollers, as shown in Fig. 7. The front ends of the rods 89 are threaded, and upon said threaded portions of the rods are disposed knurled hand-nuts 92 which may be screwed back against the lugs 90, to thereby draw forwardly the upper ends of the levers 89 and swing the lower ends of said levers rearwardly, and thus hold the composition roller out of contact with the distributing-rollers. This means for disengaging the rollers is provided to facilitate removal of the roller 88 from the retaining-hooks on the levers 86, when cleaning the rollers, and also to prevent deformation of the soft roller 88 by standing in contact with the distributing-rollers when the mechanism is not in operation. Stop-nuts 93 are pinned to the ends of the rods 89 and prevent accidental removal of the hand-nuts 92 from the rods.

To the upper edges of the rearwardly extending side-portions of the bed, adjacent to the bearings for the back-shaft, are secured brackets 94 which extend inwardly and upwardly, and form at their upper ends flat seats for supporting the ink-fountain. The latter is of ordinary form, and comprises a body-portion 95 having a roller 96 revolubly mounted therein, a scraper-plate 97 forming with the roller a trough in which the ink is held, and adjusting-screws 98 for regulating the pressure of the plate 97 against the roller. The end-portions of the fountain-body 95 rest upon and are detachably secured to the brackets 94 by screws 99. The fountain is thus held fixedly at a position such that the roller 96 is near and parallel with the roller 88, as shown in Fig. 7, and said roller 88 is intermittently moved so as to contact with the fountain-roller, as follows: On the upper rear portion of the fountain-body 95 are lugs 100 in which is pivotally mounted a shaft 101 having at the ends thereof short threaded arms 102. On said arms are screwed adjusting-caps 103 which extend forwardly from the shaft, so that the ends of said caps are adjacent to lugs 104 which project rearwardly from the upper ends of the levers 86. The caps 103 are so adjusted that when the distributing-roller frame is in the position shown in Fig. 7, at which the cam-roller 70 is in the intermediate concentric portion of the cam-slot 71, said lugs 104 will be substantially in contact with, but not pressed against the ends of the caps. At this position, therefore, the full pressure of the springs 91 will still be exerted in holding the roller 88 against the distributing-rollers. However, when the distributing-roller frame makes the slight additional rearward movement, caused by the cam-roller 70 entering the inwardly offset rear portion of the cam-slot 71, the pressure of the caps 103 against the lugs 104 swings the levers 86 slightly about the axis of the cross-rod 65, and the roller 88 is thus disengaged from the distributing-rollers and swung into engagement with the fountain-roller 96, so as to receive ink therefrom. It will be understood that the described action occurs as the crank-arm 45 and segment-plate 48 are in the extreme forward position shown in Fig. 2, and that immediately upon the commencement of the rearward movement of said parts the distributing-roller frame is moved forward slightly, thus enabling the roller 88 to swing back into engagement with the distributing-rollers, as in Fig. 7. During the greater part of the cycle of operation, therefore, said roller 88 is pressed against the distributing-rollers 77 and 78 and is frictionally driven thereby so as to transfer thereto the ink received from the fountain-roller, and to continually spread the ink over the surfaces of the large rollers and equalize the distribution of the ink between said rollers.

When the impression throw-off devices of the press are moved so as to prevent contact between the printing-form and the platen, it is undesirable to have the transfer-roller 88 continue making contact with the fountain-roller, and this result is attained automatically by the following means: To the shaft 101 there is connected a rod 105 which extends rearward and downwardly and rests upon a cam 106 secured on the back-shaft 20. Said cam is so arranged that when the back-shaft is rotated by the impression throw-off mechanism the rod 105 is raised to the position shown by dotted lines in Fig. 7, and the shaft 101 thereby rotated so as to slightly lower the front ends of the caps 103. The latter are thus displaced so as not to contact with the lugs 104 during the rearward movement of the distributing-roller frame, and the rearward swinging movement of the transfer-roller 88 is thus prevented, said roller remaining in constant contact with the distributing-rollers and not engaging the fountain-roller.

For actuating the fountain-roller, the same is provided at one end with a roller-clutch comprising a disk 107 having peripheral notches or pockets in which are disposed rollers 108, said disk and rollers being enclosed by a band or ring 109 having a slotted arm 110 formed integrally therewith as shown in Fig. 8. A screw 111 extends through the slot in the arm 110 and is provided with a wing-nut 112 by means of which a sleeve 113 may be clamped against the side of the arm at any adjusted position longitudinally of the slot. The upper end of a connecting-link 114 is pivoted on the sleeve 113, and the lower end of said link is pivotally and detachably connected with the cam-roller arm 69 by the means shown in Fig. 9. Referring to said figure, a stud 115 is fixedly connected with and extends inwardly from the bearing-portion of the cam-roller 70. On said stud is mounted a tubular sleeve 116 of which the reduced end-portion adjacent to the arm 69 fits slidably upon the stud 115 and fits revolubly within the opening in the lower head of the connecting-link 114. The remaining portion of the sleeve 116 is recessed or counterbored to form a chamber in which a spring 117 is disposed around the stud 115, with one end of the spring bearing against a stop-washer 118 secured at the end of the stud. The diameter of said stop-washer is such as to fit slidably within the bore of the sleeve, whereby the latter may be pulled toward the end of the stud to disengage the reduced end-portion from the lower head of the connecting-link. At one side of said head of the link there is a slot 119, shown in Fig. 10, of such width that when the sliding sleeve 117 is disengaged from the link the latter may be swung laterally off the stud, the stud passing through the slot. It will be seen that when the link is connected with the arm 69 the reciprocating movements of the latter will be communicated to the arm 10, causing a movement of the clutch-band 109 of greater or less extent, according to the position at which the sleeve 113 is clamped along the slotted arm. Movements of the clutch-band in one direction are communicated to the disk 107, the rollers 108 wedging into the narrow ends of the pockets in the disk, while during movement of the band in the other direction the rollers move into the larger ends of the pockets and the disk is not actuated. It will be seen that, owing to the variation in the effective length of the arm 110 by adjustment of the position of the screw 111 longitudinally of the slot, the extent of the rotary movement imparted to the fountain-roller 96 at each movement of the driving connection may be varied within any limits desired.

From the foregoing the structure and operation of the mechanism as a whole will be clearly apparent. It may be noted that the driving gear-train for actuating the distributing-rollers is arranged so that the direction of movement of said rollers is such that as they come into contact with the form-rollers all the contacting roller-surfaces are moving in the same direction, and, similarly, when the distributing-rollers are withdrawn from contact with the form-roller, the latter are left rotating in the direction tending to start their downward movement toward the printing-form. It will be seen that, by the substantially constant rotation of the distributing-rollers, which pause only momentarily as their direction of movement is reversed, the substantially constant contact with said rollers of the transfer-roller 88, and the alternating longitudinal movements of the large rollers, the distribution of ink over the surfaces of the latter will be effectively carried on while the form-rollers are not in contact therewith, or while the form-rollers are traversing the printing-form. Then when the form-rollers are brought into engagement with the distributing-rollers, the ink on the surfaces of the latter will be already uniformly spread, so that during the several revolutions in each direction, made by the form-rollers during the dwell in the movement of the roller-frames 35, the ink will be effectively and uniformly spread over the surfaces of the form-rollers. By changing the positions of the pins 81, as described, the longitudinal oscillation of the rollers is stopped, and longitudinal spread of the ink is thus limited when it is desired to confine the same to particular portions of the rollers.

Now, having described my invention, what I claim and desire to secure by Letters Patent is:

1. In a printing press having an oscillating bed, the combination with form-roller frames pivoted on the bed, and form-rollers carried by said roller-frames and movable thereby to traverse the printing-form, of actuating means for said roller-frames comprising cam-grooved arms carried thereon, and pivoted oscillating arms having means engaging and movable in the cam-grooves, portions of the cam-grooves being concentric with the axis of oscillation of said arms when the roller-frames are in a predeterminable position, whereby to cause a dwell of the roller-frames at said position.

2. In a printing press of the class described, the combination with an oscillating bed, form-roller frames pivoted thereon, and form-rollers carried by said roller-frames, of distributing-roller frames on which said rollers are mounted, said frames being movably mounted on the bed, means for actuating the form-roller frames to cause the form-rollers to traverse the printing-form and to dwell in proximity to the distributing-rollers, means for actuating the distributing-roller frames to move said rollers into and out of engagement with the form-rollers during the dwell thereof, and actuating means for rotating the distributing-rollers in alternating directions.

3. In a structure as set forth in claim 2, a single driving element connected with a fixed frame-member and with driving means pivoted on the bed, whereby said driving means is actuated in alternating directions during the oscillating movements of the bed, and means connecting said driving means with the means for actuating the form-roller frames, the distributing-roller frames, and the distributing-rollers, whereby the movements thereof are timed with the oscillation of the bed.

4. In a printing press of the described class, the combination with a bed having means for holding a printing-form, tracks extending adjacent to said form-holding means, and form-rollers movable to traverse the printing-form and having trucks normally resting on said tracks; of actuating means for said form-rollers adapted to dwell between the form-traversing movements, ink-distributing rollers, a frame movably mounted on the bed and carrying said distributing-rollers, means for actuating said frame to engage the distributing-rollers with the form-rollers during the dwell of the form-roller actuating means, and to simultaneously lift the form-roller trucks from the tracks, and means for driving said distributing-rollers in alternating directions.

5. In an ink-distributing mechanism for printing presses, distributing-rollers disposed in parallel and adjacent relation to each other, means for driving said rollers in alternating directions, shafts on which said rollers are mounted revolubly, a supporting frame on which said shafts are mounted revolubly and slidably, said shafts having screw-threaded portions, threaded means on said frame engaging said shaft-portions whereby to move the shafts longitudinally during rotation thereof, and means for alternatively connecting the shafts fixedly with the rollers or connecting said shafts fixedly with the frame.

6. In a structure as set forth in claim 2, an ink-fountain mounted fixedly on the bed, a transfer-roller, supporting means therefor mounted pivotally on the distributing-roller frame, means normally holding said transfer-roller in yielding engagement with the distributing-rollers, and means engageable with the supporting-means of the transfer-roller during movement of the distributing-roller frame toward the ink-fountain for swinging the transfer-roller toward the fountain independently of the distributing-rollers.

7. In a mechanism of the class described, an ink-fountain having a feed-roller, a recessed clutch-disk carried by said roller, a clutch-band disposed around said disk, rollers disposed in the recesses of the disk and engageable with the band and disk to transmit to the latter movements of the band in one direction only, an arm extending radially from the clutch-band, pivot-forming means mounted upon and adjustable longitudinally of said arm, a connecting-link carried on said pivot-forming means, a reciprocating actuating member, and means for detachably connecting said link therewith, said connecting means comprising a sleeve having a part adapted to fit pivotally within the connecting-link, the sleeve being mounted on the actuating member and movable axially to disengage the same from the connecting-link.

8. In a printing press of the class described, the combination with an oscillating bed having a back-shaft with eccentric end-portions, crank-driven arms connected with said end-portions of the back-shaft for actuating the bed, and impression-throw-off devices for rotating the back-shaft to vary the relation of the bed to said crank-driven arms; of an ink-fountain mounted on the bed, ink distributing-rollers, a transfer-roller normally engaging said distributing-rollers, pivoted levers carrying said transfer-roller, means for moving the axis of said levers from and toward the ink-fountain, abutments engageable by said levers to control movements thereof for swinging the transfer-roller from engagement with the distributing-rollers to engagement with the ink-fountain, and means actuated by rotation of the back-shaft for moving said abutments to inoperative relation with said levers.

9. In a printing press of the class described, an oscillating bed, an ink-fountain mounted on the bed, ink-distributing rollers, means for intermittently transferring ink from the fountain to said distributing-rollers, reciprocating driving means actuated by oscillation of the bed and rotating the distributing-rollers in alternating directions, form-rollers, means connecting the reciprocating driving means and the form-rollers whereby the latter are actuated to traverse a form held upon the bed and to dwell adjacent to the distributing-rollers intermediate the form-traversing movements, and means for moving the distributing-rollers to engage the form-rollers during the dwell thereof.

EDWARD T. WATERS.